(12) United States Patent
Wagner

(10) Patent No.: US 8,640,992 B2
(45) Date of Patent: Feb. 4, 2014

(54) DRILL-ELASTIC AND FLEXURALLY RIGID ROD ELEMENT FOR THE SUPPORT AND GUIDANCE OF A MOVABLE FLAP RELATIVE TO A WING OF AN AIRCRAFT

(75) Inventor: Alois Wagner, Dietramszell (DE)

(73) Assignee: Eurocopter Deutschland GmbH, Donauwoerth (DE)

( * ) Notice: Subject to any disclaimer, the term of this patent is extended or adjusted under 35 U.S.C. 154(b) by 1041 days.

(21) Appl. No.: 12/530,913

(22) PCT Filed: Mar. 5, 2008

(86) PCT No.: PCT/DE2008/000399
§ 371 (c)(1),
(2), (4) Date: Sep. 11, 2009

(87) PCT Pub. No.: WO2008/110144
PCT Pub. Date: Sep. 18, 2008

(65) Prior Publication Data
US 2010/0090062 A1    Apr. 15, 2010

(30) Foreign Application Priority Data
Mar. 12, 2007 (DE) .......................... 10 2007 012 167

(51) Int. Cl.
*B64C 1/06* (2006.01)
(52) U.S. Cl.
USPC .......................................... 244/131; 244/213
(58) Field of Classification Search
USPC ........... 244/17.11, 17.23, 211, 212, 213, 215, 244/129.1, 123.1, 131, 133, 99.2, 99.3; 416/23, 24, 240
See application file for complete search history.

(56) References Cited

U.S. PATENT DOCUMENTS

2004/0065044 A1 * 4/2004 Bleibler ...................... 52/649.1

FOREIGN PATENT DOCUMENTS

| DE | 19909257 | 9/2000 |
|----|----------|--------|
| EP | 1085152  | 3/2001 |
| GB | 2348856  | 10/2000 |
| WO | 0063073  | 10/2000 |

OTHER PUBLICATIONS

International Search Report dated Sep. 1, 2008, in PCT application.

* cited by examiner

*Primary Examiner* — Tien Dinh
*Assistant Examiner* — Michael A Fabula
(74) *Attorney, Agent, or Firm* — Brooks Kushman P.C.

(57) ABSTRACT

A drill-elastic and flexurally rigid rod element (10) for supporting and guiding a movable flap (24) relatively to a wing (26) of an aircraft, wherein the rod element encompasses a cross-shaped profile cross section and first and second fastening sections (20, 22) and is made of a fiber composite material and the rod element can be fastened to the wing in a fixed manner via the first fastening sections (20) and to the flap (24) via the second fastening sections (22). The rod element and the fastening sections are laminated from a plurality of unidirectional, preimpregnated fibrous layers—prepreg layers—which are bonded to one another in the area of the fastening sections as well as in the cross-shaped cross section core area (28) and which are separated from one another in each case by a separating film inserted between the prepreg layers outside of the areas.

20 Claims, 4 Drawing Sheets

DRILL-ELASTIC AND FLEXURALLY RIGID ROD ELEMENT FOR THE SUPPORT AND GUIDANCE OF A MOVABLE FLAP RELATIVE TO A WING OF AN AIRCRAFT

CROSS-REFERENCE TO RELATED APPLICATIONS

This application is the National Phase of PCT/DE2008/000399 filed on Sep. 11, 2009, which claims the benefit of DE 10 2007 012 167.0, the disclosures of which are incorporated in their entirety by reference herein.

BACKGROUND OF THE INVENTION (1) Field of the Invention

The invention relates to a drill-elastic and flexurally rigid rod element for supporting and guiding a movable flap relatively to a wing of an aircraft.

(2) Description of Related Art

The general term "aircrafts" will hereinbelow refer to fixed wing aircrafts as well as to rotary wing aircrafts, that is, the term "wings" comprises an airfoil wing of the fixed wing aircraft as well as a rotor blade of the rotary wing aircraft. Even though the invention can on principal also be used for fixed wing aircrafts, only a rotor blade of a rotary wing aircraft will be considered below in detail.

It is known that air vortexes, which generate noise and vibrations, are created during rotor operation on rotor blades of a rotary wing aircraft. These air vortexes are noticeable in particular in a cabin of the rotary wing aircraft, they impact the passenger comfort and negatively impact the durability of essential components of the rotary wing aircraft. This, in turn, limits the range of use of the rotary wing aircraft. Rotor blades, which are equipped with movable rotor blade flaps, which can be controlled by means of actuators, are used to avoid such air vortexes.

A rotor blade with a movably supported flap is known from DE 101 16 479 A1. The flap is movably fastened to the rotor blade by means of ball bearings. The control of the flap is carried out via a piezo actuator, which is arranged at a distance in a front area of the rotor blade, viewed in the direction of the profile depth.

With known rotor blades of the afore-mentioned type, the efficiently of the flap already decreases after a relatively short period of operation and it rapidly loses its efficiency, because a play is rapidly created due to wear of the highly-stressed flap bearing. The available deflection area of the flap is thus reduced, the aerodynamic and mechanical flap effect decreases and the friction in the flap bearing is highly increased. This, in turn, also impacts the efficiency of the actuator, which controls the flap. Extensive maintenance or replacement operations are thus required within relatively brief time intervals.

A connecting means, which provides for a ball bearing-free support of a movable flap on a rotor blade of a rotary wing aircraft is known from DE 199 09 257 C1. For this, the connecting means is arranged in the area between rotor blade and flap and is connected to the rotor blade and the flap via corresponding connecting areas. A torsion of the connecting means takes place in response to a deflection of the flap. The generic connecting means is embodied as a drill-elastic and flexurally rigid rod element made of fiber composite material and can encompass a cross-shaped profile cross section.

BRIEF SUMMARY OF THE INVENTION

The invention is based on the object of further developing a drill-elastic and flexurally rigid rod element for positioning and guiding a movable flap relative to a wing in such a manner that the rod element encompasses improved characteristics with reference to drill elasticity and flexural rigidity.

This object is solved by means of characterizing features of claim in combination with its preamble features.

The dependent claims form an advantageous development of the invention.

The invention is based on the realization that the drill elasticity and flexural rigidity of the rod element can be specifically influenced by means of a corresponding material selection.

According to the invention, the drill-elastic and flexurally rigid rod element for supporting and guiding a movable flap relative to a wing of an aircraft comprises a cross-shaped profile cross section with first and second fastening sections and is made of a fiber composite material. The rod element can be connected to the wing in a fixed manner via the first fastening sections and to the flap via the second fastening sections. According to the invention, the rod element and the fastening sections are laminated from a plurality of unidirectional, preimpregnated fibrous layers—prepreg layers—which are bonded to one another in the area of the fastening sections as well as in a cross-shaped cross section core area and which are separated from one another in each case by means of a separating film inserted between the prepreg layers outside of said areas. Due to the embodiment of the rod element according to the invention, provision is made for a rod element, which is inserted in an advantageous manner in areas comprising a low flexural rigidity, that is, comprising a high drill elasticity, namely the areas into which a separating film is inserted between two prepreg layers located on top of one another in each case. At the same time, these areas are characterized by a high flexural rigidity. A specific dimensioning of the rod element, namely low torsion rigidity in the area about the flap axis and a high flexural rigidity in the direction of lift, are made possibly through this in a simple manner.

Further advantages are, in particular, that the rod element can be produced in a simple and cost-efficient manner and that it does not require any maintenance. Such a support of a flap on a wing is furthermore without friction and encompasses a high durability (>2000 h).

According to an embodiment of the invention, the rod element comprises a first cross member oriented in the direction of the profile depth of the wing comprising a total length $L_T$ and a second cross member oriented in the direction perpendicular to the profile depth comprising a total length $L_A$ being arranged perpendicular thereto, wherein the total length $L_T$ of the first cross member is greater than the total length $L_A$ of the second cross member. The uneven embodiment of the two cross members proves to be advantageous in view of the low torsion rigidity and high flexural rigidity required for the rod element area by area.

Preferably, the two cross members, based on the total length $L_T$ of the first cross member, thereby encompass a width-length ratio $L_A/L_T$ of 0.28 to 0.34. The width-length ratio $L_A/L_T$ of 0.28 to 0.34 proves to be advantageous, because a functional and compact design is ensured through this.

The cross-shaped profile cross section of the rod element, viewed in the direction of the profile depth, is embodied so as to be asymmetrical in an advantageous manner, that is, the first cross member of the rod element encompasses a first section comprising a length $L_{T1}$, which is assigned to the wing, and a second section comprising the length $L_{T2}$, which is assigned to the flap, wherein the length $L_{T1}$ of the first section is greater than the length $L_{T2}$ of the second section.

This has the effect that torsion springs comprising a high drill elasticity, which are dimensioned to a correspondingly high extent, are available for the torsion of the rod element, which is caused/necessary by a deflection of the flap, so that a smooth-running pivoting of the flap about a longitudinal rotor axis is ensured.

First design computations have shown that the best results are attained when, based on the total length $L_T$ of the first cross member, the first section encompasses a width-length ratio $L_{T1}/L_T$ of 0.6 to 0.73 and when the second section encompasses a width-length ratio $L_{T2}/L_T$ of 0.3 to 0.36.

Preferably, the first and the second cross member encompass the same cross sectional thickness d. This has the effect that a simple and cost-efficient production is ensured.

Based on the total length $L_T$ of the first cross member, the thickness ratio of the two cross member $d/L_T$ is 0.056 to 0.068 in each case. A compact and simple design is ensured by means of the thickness ratio of 0.056 to 0.068.

According to a particularly advantageous embodiment of the invention, the rod element and the first and second fastening sections are embodied in one piece. This, in turn, proves to be advantageous in view of a simple and cost-efficient production of the rod element.

To ensure a simple fastening of the rod element on the wing or on the flap, respectively, the first and second fastening sections of the rod element are embodied in each case in a bar-shaped manner.

The fastening between the first fastening sections and the wing or between second fastening sections and the flap, respectively, can thereby be embodied in a substance-to-substance bond and/or in a force-fitting manner and/or in a form-locking manner.

Further advantages, features and possibilities for using the instant invention result from the following description in combination with the exemplary embodiment illustrated in the drawing.

BRIEF DESCRIPTION OF THE SEVERAL VIEWS OF THE DRAWINGS

The invention will be described in detail below by means of the exemplary embodiment illustrated in the drawing. The terms and assigned reference numerals, which are used in the list of reference numerals mentioned below, are used in the description, in the claims and in the drawing.

In the drawing:

FIG. 1 illustrates a drill-elastic and flexurally rigid rod element, which is identified with reference number 10, in a more or less schematic manner. The rod element 10 encompasses a cross-shaped profile comprising a first flange or cross member 12 oriented in the direction of the profile depth T comprising a length $L_T$ and a second flange or cross member 14 oriented in the direction perpendicular to the direction of the profile depth A comprising a length $L_A$.

DETAILED DESCRIPTION OF THE INVENTION

Figure 1:
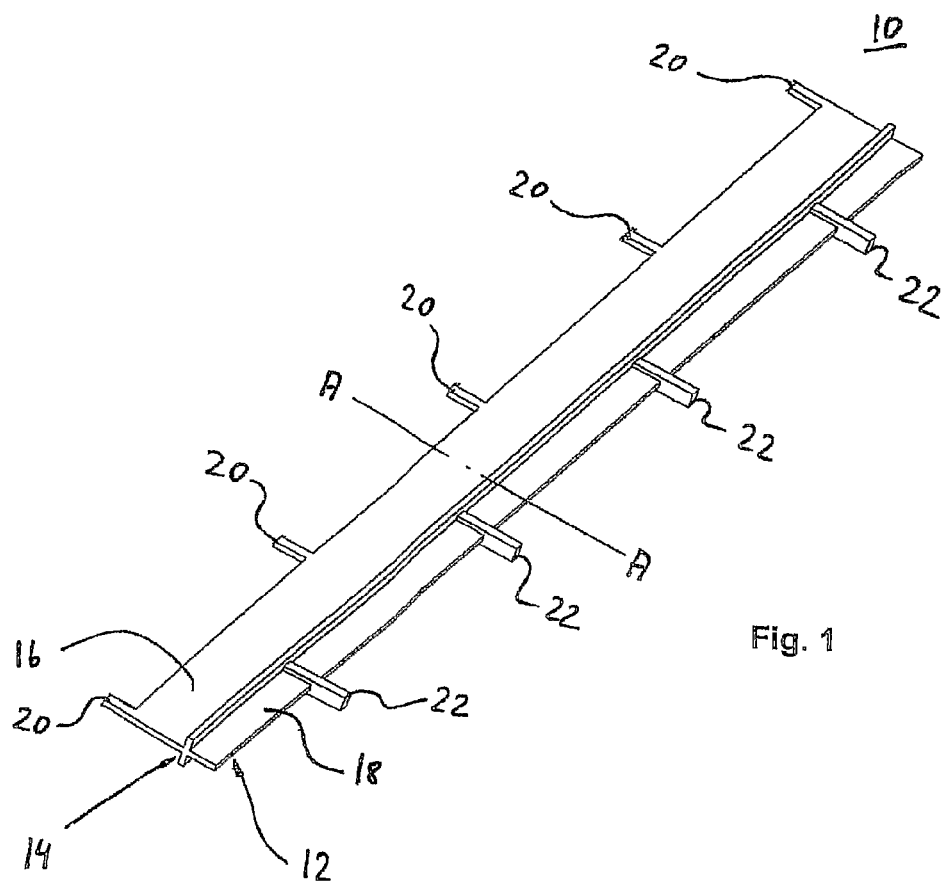
FIG. 1 shows a perspective illustration of a drill-elastic and flexurally rigid rod element.

The first cross member 12 oriented in the direction of the profile depth T is divided into two sections by means of the second cross member 14, namely into a first section 16 comprising a length $L_{t1}$ and a second section 18 comprising a length $L_{t2}$.

While the first section 16 encompasses several first fastening sections 20 for fastening to a rotor blade, several second fastening sections 22 are arranged on the second section 18 for fastening to a flap. In the instant case, the rod element 10 as well as the first and second fastening elements 20, 22 are embodied in one piece.

Figure 2:
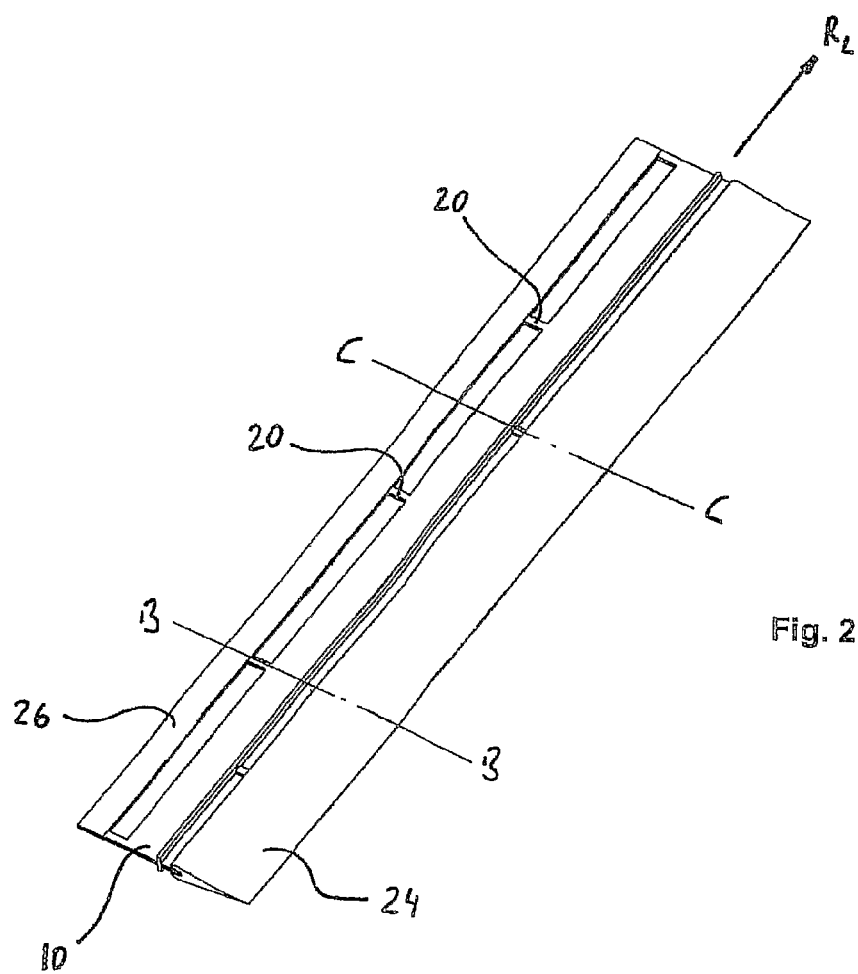
FIG. 2 shows the rod element from FIG. 1, which is connected to a structure area of a rotor blade on the one hand and to a flap on the other hand in a fixed manner via its fastening sections.

As can be seen in particular from FIG. 2, the rod element 10 serves the purpose of supporting and guiding a pivotally movable flap 24 on a rotor blade 26. For the sake of clarity, only a structural element of the rotor blade 26 is illustrated. In the instant case, the connection between first fastening sections 20 and the rotor blade 26 as well as between second fastening sections 22 and flap 24 is embodied in each case as an adhesive bond.

The pivoting of the flap 24 is initiated in the known manner via at least one actuator, which is or are, respectively, in operative connection with the flap 24 via corresponding power transfer means. Due to the fastening of the rod element 10 to the rotor blade 26 and the flap 24 via the first and second fastening sections 20, 22, a torsion of the rod element 10 takes place in response to a deflection of the flap 24. It is thus necessary for a flawless operation of the rod element 10, for the rod element 10 to encompass the smallest possible torsion rigidity or the highest possible drill elasticity, respectively, along a longitudinal rotor blade axis $R_L$, so as to provide for a smooth-running pivoting motion of the flap 24 and for the rod element 10 to encompass a high flexural rigidity in the direction of lift A and a high tensile strength in the direction of the profile depth T, so as to ensure a sufficient stability.

Figure 3:
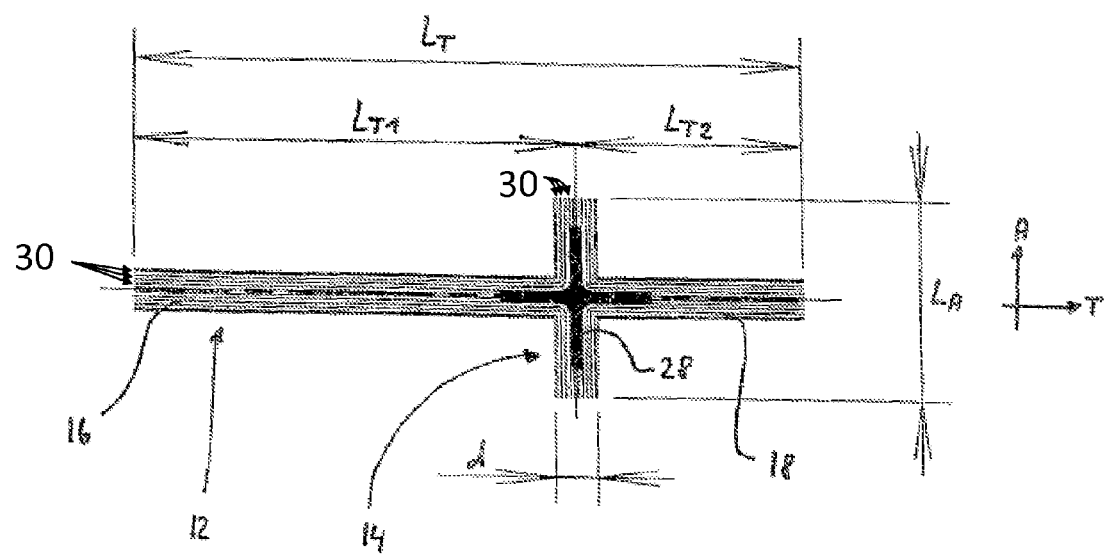
FIG. 3 shows a cross section along line A-A in FIG. 1.

These requirements on the rod element 10 are fulfilled by means of the design according to the invention:

As can be seen from FIG. 3, the rod element 10 is laminated from a plurality of unidirectional, preimpregnated carbon fiber layers, also identified as prepreg layers hereinbelow, which are in each case arranged perpendicular to the cross sectional plane.

While the individual prepreg layers are bonded to one another in a cross-shaped cross section core area 28, the prepreg layers are in each case separated from one another outside of this cross section core area 28 by means of a film 30, which is inserted between two prepreg layers.

The first and second fastening sections 20, 22, which are not shown in this sectional view, are also laminated from a plurality of unidirectional carbon fiber prepreg layers, which are embodied in a film-free manner, that is, which are bonded to one another in accordance with the cross section core area 28.

By means of the design of the rod element 10 according to the invention, the rod element encompasses a high flexural rigidity in the direction perpendicular to the direction of profile depth A and a high tensile rigidity in the direction of the profile depth T, while a sufficient torsional softness of the rod element 10 about the longitudinal rotor blade axis $R_L$ is ensured between two prepreg layers by means of the inserted separating film.

Figure 4:
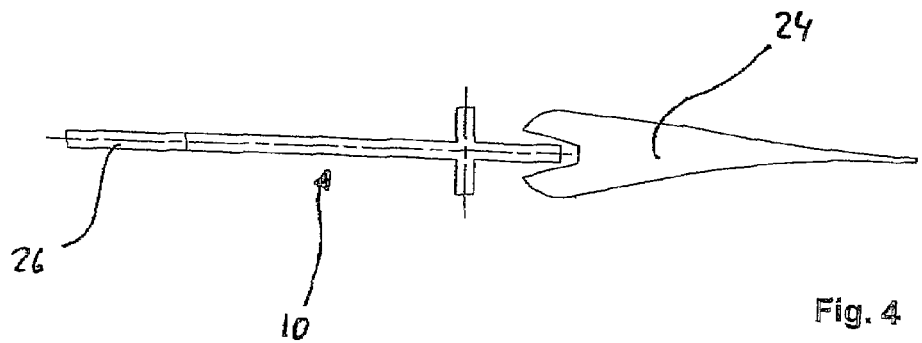
FIG. 4 shows a cross section along line B-B in FIG. 2.
Figure 5:
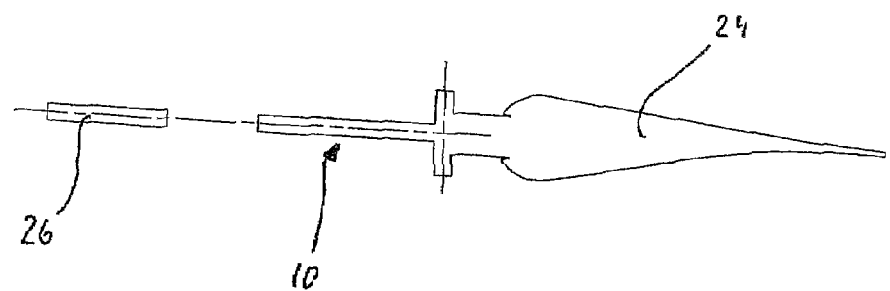
FIG. 5 shows a cross section along line C-C in FIG. 2.

FIG. 4 and FIG. 5 once again show the connection of the rod element 10 to the flap 24 or to the rotor blade 26, respectively, in an enlarged illustration.

In a concrete exemplary embodiment of the rod element 10 for positioning a 700 mm long flap 24, the length $L_T$ of the first cross member 12 is $L_T$=45 mm and the length $L_A$ of the second cross member 14 is $L_A$=14 mm. While the first section 16 of the first cross member 12 is $LT_1$=30 mm long, the second section 18 of the first cross member 12 encompasses a length of $L_{T2}$=15 mm. The thickness d of the two cross members 12, 14 is d=2.8 mm in each case. Based on $L_T$ as reference length, the rod element 10 encompasses the following non-dimensional figures: $L_A/L_T$=0.31; $L_{T1}/L_T$=0.66; $L_{T2}/L_T$=0.33; $d/L_T$=0.062.

LIST OF REFERENCE NUMERALS 10 rod element
12 first cross member
14 second cross member
16 first section of the first cross member
18 second section of the first cross member
20 first fastening sections
22 second fastening sections
24 flap
26 rotor blade
28 cross section core area
30 separating film
T direction of profile depth
A direction perpendicular to the direction of the profile depth
$R_L$ longitudinal rotor blade axis $R_L$
d cross sectional thickness
$L_T$ length of the first cross member
$L_A$ length of the second cross member
$L_{T1}$ length of the first section of the first cross member
$L_{T2}$ length of the second section of the first cross member

The invention claimed is:

1. A drill-elastic and flexurally rigid rod element connecting an airfoil to a control surface on an aircraft, wherein the rod element encompasses a cross-shaped profile cross section comprising:
a cross-shaped cross section core area;
a cross-shaped cross section periphery extending about the cross shaped cross section core area; and
first and second fastening sections, the first fastening section connecting to the airfoil and the second fastening section connecting to the control surface, the rod element being laminated from a plurality of fibrous layers which are bonded to one another in the area of the fastening sections as well as in the cross-shaped cross section core area, wherein a separating film is disposed between two fibrous layers located adjacent one another outside of the cross-shaped cross section core area.

2. The drill-elastic and flexurally rigid rod element according to claim 1, wherein the rod element comprises a first cross member oriented in the direction of a profile depth (T) of the airfoil comprising a total length $L_T$ and a second cross member oriented in a direction (A) perpendicular to the direction of the profile depth (T) of the airfoil comprising a total length $L_A$ being arranged perpendicular thereto, wherein the total length $L_T$ of the first cross member is greater than the total length $L_A$ of the second cross member.

3. The drill-elastic and flexurally rigid rod element according to claim 2, wherein, based on the first cross member, the first and second cross members encompass an $L_A/L_T$ ratio of 0.28 to 0.34.

4. The drill-elastic and flexurally rigid rod element according to claim 2, wherein the cross-shaped profile cross section of the rod element, viewed in a direction of an airfoil longitudinal axis $R_L$, is embodied so as to be asymmetrical and that the first cross member of the rod element comprises a first section comprising a length $L_{T1}$, which is assigned to the airfoil, and a second section comprising the length $L_{T2}$, which is assigned to the control surface, wherein the length $L_{T1}$ of the first section is greater than the length $L_{T2}$ of the second section.

5. The drill-elastic and flexurally rigid rod element according to claim 4, wherein based on the total length $L_T$ of the first cross member, the first section of the first cross member encompasses a width-length ratio $L_{T1}/L_T$ of 0.6 to 0.73 and the second section of the first cross member encompasses a width-length ratio $L_{T2}/L_T$ of 0.3 to 0.36.

6. The drill-elastic and flexurally rigid rod element according to claim 3, wherein the first and second cross members encompass the same cross sectional thickness d.

7. The drill-elastic and flexurally rigid rod element according to claim 6, wherein each of the cross members, based on the total length $L_T$ of the first cross member, encompass a thickness ratio $d/L_T$ of 0.056 to 0.068 in each case.

8. The drill-elastic and flexurally rigid rod element according to claim 1, wherein the rod element and the first and second fastening sections are embodied in one piece.

9. The drill-elastic and flexurally rigid rod element according to claim 8, wherein each of the first and second fastening sections of the rod element is embodied in a bar-shaped manner.

10. The drill-elastic and flexurally rigid rod element according to claim 1, wherein the first and second fastening sections of the rod element are connected to airfoil and to the control surface in a substance-to-substance bond and/or in a force-fitting manner and/or in a form-locking manner.

11. The drill-elastic and flexurally rigid rod element according to claim 1, wherein the rod element is non-homogenous such that the cross-shaped cross section core area is made of fibrous layers bonded directly to one another and the cross-shaped cross section periphery comprises fibrous layers having separating films disposed between each adjacent fibrous layers.

12. The drill-elastic and flexurally rigid rod element according to claim 1, wherein the fibrous layers are carbon fiber layers.

13. The drill-elastic and flexurally rigid rod element according to claim 1, wherein the first and second fastening sections are formed of fibrous layers bonded directly to one another.

14. An integrally formed rod element connecting a movable flap to a wing of an aircraft, the rod element having a cross-shaped profile cross section and comprising:
a first cross member oriented in the direction of a profile depth (T) of the wing comprising a total length $L_T$; and
a second cross member oriented in a direction (A) perpendicular to the direction of the profile depth (T) of the wing comprising a total length $L_A$ being arranged perpendicular to the first cross member, wherein the total length $L_T$ of the first cross member is greater than the total length $L_A$ of the second cross member, the rod element having opposed first and second fastening sections extending from opposed ends of the first cross member, the rod element having a cross-shaped cross section core area at the intersection of the first and second cross members, the rod element being made of a fiber composite material and fastenable to the wing in a fixed manner via the first fastening section and to the flap via the second fastening section, the rod element comprising a lamination of unidirectional, fibrous layers which are bonded directly to one another in the area of the fastening sections and in the cross-shaped cross section core area and a lamination of fibrous layers separated from each other by a separating film in the areas of the first and second cross members adjacent the cross-shaped cross section core area but not in the first and second fastening sections.

15. The rod element of claim 14, wherein the cross members have a length ratio $L_A/L_T$ of 0.28 to 0.34.

16. The rod element of claim 15, wherein the cross-shaped profile cross section of the rod element, viewed in the direction of the profile depth (T), is embodied so as to be asymmetrical such that the first cross member comprises a first section comprising a length $L_{T1}$, and a second section comprising the length $L_{T2}$, wherein the length $L_{T1}$ of the first section is greater than the length $L_{T2}$ of the second section.

17. The rod element of claim 16, wherein, based on the total length $L_T$ of the first cross member, the first section of the first cross member comprises a length ratio $L_{T1}/L_T$ of 0.6 to 0.73 and the second section of the first cross member comprises a length ratio $L_{T2}/L_T$ of 0.3 to 0.36.

18. A torsionally elastic and flexurally rigid rod connecting an airfoil to a control surface, the rod element having a cross-shaped cross section and comprising:
 a core having a cross-shaped cross section;
 a rod body surrounding the core;
 a first fastening section connected to the airfoil; and
 a second fastening section connected to the control surface;
 wherein the core comprises a first plurality of laminated layers bonded to one another, the first fastening section comprises a second plurality of laminated layers bonded to one another, the second fastening section comprises a third plurality of laminated layers bonded to one another, and the rod body comprises a fourth plurality of laminated layers, wherein the layers of the fourth plurality of laminated layers are separated by a film.

19. The torsionally elastic and flexurally rigid rod of claim 18, wherein the rod body has a cross-shaped cross section and comprises a first cross member having a length $L_T$ and a second cross member oriented perpendicularly to the first cross member and having a length $L_A$, wherein the ratio $L_A/L_T$ is between 0.28 and 0.34.

20. The torsionally elastic and flexurally rigid rod of claim 19, wherein the first cross member has a first section with length $L_{T1}$ and a second section with length $L_{T2}$, wherein $L_{T1}$ is greater than $L_{T2}$ such that the ratio $L_{T1}/L_T$ is between 0.6 and 0.73.

* * * * *